United States Patent Office 3,391,155
Patented July 2, 1968

3,391,155
3-(5-NITRO-2-FURYL)-$\Delta^2$-1,2,4-TRIAZOLINES
Louis Edmond Benjamin, Norwich, N.Y., assignor to The Norwich Pharmacal Company, Norwich, N.Y., a corporation of New York
No Drawing. Continuation-in-part of application Ser. No. 247,514, Dec. 27, 1962. This application July 11, 1963, Ser. No. 294,240
7 Claims. (Cl. 260—308)

ABSTRACT OF THE DISCLOSURE

A new series of 3-(5-nitro-2-furyl)-$\Delta^2$-1,2,4,-triazolines possess chemotherapeutic activity against various bacteria and coccidia.

---

This application is a continuation-in part of my copending application Ser. No. 247,514, filed Dec. 27, 1962.

This invention relates to novel chemical compounds which may be represented by the formula:

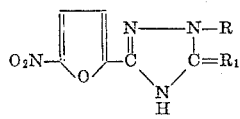

wherein
R represents hydrogen, methyl, acetyl, hydroxyethyl or diethoxythiophosphoryl; and $R_1$ represents oxygen, imino or acetylimino.

Also comprehended within this invention are methods for preparing these compounds and compositions containing them.

These compounds are crystalline solids, somewhat soluble in water and more soluble in organic solvents. They are highly active parasiticides, being particularly noteworthy for their toxic action upon bacteria and coccidia. In sub-toxic doses they combat lethal infections induced by *Staphylococcus aureus* and *Salmonella typhosa*. For instance, when administered perorally to mice lethally infected by the aforementioned bacteria in low doses ranging from 26–102 mg./kg. they control mortality. When administered via the feed supply, at levels of from 0.011–0.022%, to chickens exposed to and infected by *Eimeria tenella*, they combat the mortality and morbidity provoked by that protozoan when left unchecked.

These compounds are adapted to be readily combined as the active constituent of compositions designed for facile administration to combat infectious processes. They may be formulated in the form of tablets, suspensions, elixirs, solutions, troches and the like using excipients and adjuvants commonly employed in the apothecary art. In veterinary use, the feed and water supply of animals serve as additional convenient carriers for their administration.

These compounds are readily prepared. In their preparation it is preferred to initially react an alkyl 5-nitro-2-furimidate salt, such as the hydrochloride, with a carbonyl derivatizing agent; e.g., semicarbazide, aminoguanidine or substituted derivatives thereof, in the presence of a solvent such as alcohol and at ambient or slightly elevated temperature to hasten the reaction; followed by thermally effecting ring closure of the resultant product in the presence of a high boiling solvent such as nitrobenzene. The products are recovered in conventional fashion; e.g. by filtration from the cooled reaction mixture or solvent precipitation with immiscible solvents, such as diethyl ether, followed by filtration. They may be recrystallized from common solvents such as water, glacial acetic acid, dimethylformamide, methanol and mixtures thereof.

The 3 - (5 - nitro-2-furyl)-$\Delta^2$-1,2,4-triazolines thus obtained are readily converted into the further triazoline derivatives of this invention by treatment with reagents such as acetyl chloride, acetic anhydride, acetic acid, ethylene bromohydrin, methyl iodide, and O,O-diethyl phosphorochloridothioate.

In order that this invention may be readily available to and understood by those skilled in the art, the following illustrative, but not limitative, examples thereof are supplied:

Example I.—5-oxo-3-(5-nitro-2-furyl)-$\Delta^2$-1,2,4-triazoline (A) Ethyl 5-nitro-2-furimidate hydrochloride. — A suspension of 900 grams (6.5 moles) of 5-nitro-2-furonitrile in 5450 ml. of ethanol (anhydrous) in a 12 liter flask, equipped with a stirrer and gas-inlet tube is cooled to 10° C. with an ice-water bath. Dry HCl gas is added rapidly with continued cooling for about 1.5 hours until a nearly complete solution is obtained. At this point the product begins to precipitate from the solution and the flow of HCl gas in continued at a reduced rate for two to three hours. The nearly white product is separated by filtration and is washed with 1500 ml. of ice-cold ethanol and rinsed with anhydrous ether. After drying overnight at 60° C. the product is pale yellow, weighing 808 g. (56% of theory), M.P. 158–160° C.

(B) Preparation of N-ureido-5-nitro - 2 - furamidine.—A mixture of ethyl 5-nitro-2-furimidate hydrochloride (100 g.; 0.45 mole), semicarbazide (34 g.; 0.45 mole), and ethanol (800 ml.) is heated at 50–55° C. for 30 minutes with occasional stirring. The mixture is cooled and diluted with water (2.1). An orange solid separates which is collected by filtration. The yield of product is 60 g. (63%); M.P. 274–275° C.

*Anaylsis.*—Calcd. for $C_6H_7N_5O_4$: C, 33.81; H, 3.31; N, 32.86. Found: C, 34.07; H, 3.48; N, 32.81.

(C) Preparation of 5-oxo-3-(5-nitro-2-furyl)-$\Delta^2$-1,2,4-triazoline.—A solution of 5-nitro-N-ureido-2-furamidine (60 g.; 0.28 mole) in nitrobenzene (450 ml.) is boiled in a 1 l. flask for 15 minutes. The mixture is cooled and diluted with ether (400 ml.). The dark solid which separates is collected by filtration and is washed with ether. The product weighs 43 g. (78%) and melts at about 270° C. Recrystallization of the product from 4 l. of water gives a pale yellow solid (31 g.); M.P. 277–279° C.

*Analysis.*—Calcd. for $C_6H_4N_4O_4$: C, 36.74; H, 2.06; N, 28.57. Found: C, 36.75; H, 2.31; N, 28.64.

Example II.—5-imino-3-(5-nitro-2-furyl)-$\Delta^2$-1,2,4-triazoline (A) N - guanidino - 5-nitro-2-furamidine dihydrochloride.—Aminoguanidine hydrochloride (55.5 g.; 0.5 mole) is dissolved in dimethylformamide (600 ml.) at 60° C. To this solution is added ethyl 5-nitro-2-furimidate hydrochloride (110 g.; 0.5 mole). The solution is heated at 50–60° C. for 30 minutes. The solution is cooled and diluted with ether until an oil separates. After decanting the ethereal layer, the oily residue is triturated with ether and then suspended in ethanol. The crystals are collected by filtration, washed with ether, and dried at 80° C. The yield of product is 90 g. (63%); M.P. 204–206° C.

*Analysis.*—Calcd. for $C_6H_8N_6O_3 \cdot 2HCl$: C, 25.26; H, 3.54; N, 29.48; Cl, 24.87. Found: C, 25.23; H, 3.58; N, 29.49; Cl, 25.14.

(B) Preparation of 5-imino-3-(5-nitro-2-furyl)-$\Delta^2$-1,2,4-triazoline.—A solution of N-guanidino-5-nitro-2-furamidine dihydrochloride (90 g.) in nitrobenzene (400 ml.) is refluxed for 10–15 minutes. The hot nitrobenzene solution is decanted from the solid residue. A yellow solid separates from the nitrobenzene solution on cooling. The cool nitrobenzene solution is diluted with ether and is filtered. The yellow solid is washed with ether and is dried by suction. The yield of product is 32 g. (51%); M.P. 277–279° C. This may be recrystallized from water to give a melting point of 289–90° C.

*Analysis.*—Calcd. for $C_6H_5N_5O_3$: C, 36.93; H, 2.58; N, 25.89. Found: C, 37.07; H, 2.80; N, 25.94.

Example III.—1-methyl-5-oxo-3-(5-nitro-2-furyl)-$\Delta^2$-1,2,4-triazoline (A) Preparation of 5-nitro-N-(1-methylureido)-2-furamidine hydrochloride.—A mixture of ethyl 5-nitro-2-furimidate hydrochloride (110 g.; 0.5 mole), ethanol (500 ml.) and 2-methylsemicarbazide (45 g.; 0.5 mole) is heated at 50–60° C. for 1 hour. The mixture is cooled and diluted with ether to give a light yellow solid which is slightly hygroscopic and is soluble in water. The yield is approximately 100 g. (76%). This is converted to the base by treatment with sodium carbonate. M.P. 185–186° C.

*Analysis.*—Calcd. for $C_7H_9N_5O_4$: C, 37.01; H, 3.99; N, 30.83. Found: C, 36.89; H, 3.77; N, 30.90.

(B) Preparation of 1-methyl-5-oxo-3-(5-nitro-2-furyl)-$\Delta^2$-1,2,4-triazoline.—5-nitro-N - (1 - methylureido)-2-furamidine hydrochloride (100 g.) is heated in refluxing nitrobenzene (400 ml.) for 15 minutes. The mixture is cooled and diluted with ether to give a dark solid. The solid is collected by filtration, washed with ether and dried by suction. The crude product weighs 60 g. (75%) and melts at 270° C. Recrystallization from water (150 ml./g.) gives the product as fluffy light yellow crystals (35 g.); M.P. 275–276° C.

*Analysis.*—Calcd. for $C_7H_6N_4O_4$: C, 40.00; H, 2.88; N, 26.66. Found: C, 39.97; H, 2.70; N, 26.38.

Example IV.—1-acetyl-5-imino-3-(5-nitro-2-furyl)-$\Delta^2$-1,2,4-triazoline

A mixture of 5-imino-3-(5-nitro-2-furyl)-$\Delta^2$-1,2,4-triazoline (20 g.; 0.15 mole), acetic anhydride (10 ml.), and glacial acetic acid (300 ml.) is heated on the steam bath for 20 minutes. A solution is obtained initially and a solid begins to separate from solution after a few minutes of heating. The mixture is cooled, diluted with ether and filtered. The yield of product is 34 g. (96%). The product is dissolved in hot dimethylformamide (25 ml./g.) treated with charcoal, and filtered. Hot water is added to the warm solution until it is slightly turbid. The solution is allowed to cool slowly. The yield is 30 g.

*Analysis.*—Calcd. for $C_8H_7N_5O_4$: C, 40.51; H, 2.87; N, 29.53. Found: C, 40.47; H, 2.86; N, 29.40.

Example V.—5-acetylimino-3-(5-nitro-2-furyl)-$\Delta^2$-1,2,4-triazoline

Method A.—5-imino - 3 - (5-nitro-2-furyl)-$\Delta^2$-1,2,4-triazoline (29 g.; 0.15 mole) is placed in glacial acetic acid (580 ml.) and treated with dry hydrogen chloride (5.5 g.; 0.15 mole). The solution is refluxed for 20 hours. The solution is cooled, diluted with water and filtered. The solid weighs 25 g. (70%) M.P. 340° C.

Recrystallization from dimethylformamide (15 ml./g.) raises the melting point to 343–345° C.

Method B.—1-acetyl-5-imino - 3 - (5-nitro-2-furyl)-$\Delta^2$-1,2,4-triazoline (4.8 g.; 0.02 mole) is added with stirring to benzophenone (20 g.) at 290° C. When the addition is complete, the temperature is kept at 290–295° C. for 2 minutes. After cooling to room temperature, the mixture is diluted with ether and filtered. Recrystallization from dimethylformamide (15 ml./g.) and water gives the product melting at 343–345° C.

*Analysis.*—Calcd. for $C_8H_7N_5O_4$: C, 40.51; H, 2.97; N, 29.53. Found: C, 40.76; H, 3.13; N, 29.41.

Example VI.—1-(2-hydroxyethyl)-5-oxo-3-(5-nitro-2-furyl)-$\Delta^2$-1,2,4-triazoline (A) N-[1-(2 - hydroxyethyl)ureido]-5-nitro-2-furamidine.—A mixture of ethyl 5-nitro-2-furimidate hydrochloride (24 g.; 0.2 mole), 2-(2-hydroxyethyl) semicarbazide (24 g.; 0.2 mole), and ethanol (300 ml.) is heated at 50–60° C. for 30 minutes. After cooling, the mixture is diluted with ether to yield a gummy solid. The solid is dissolved in a minimal amount of water and any undissolved solid filtered off. The filtrate is made basic with sodium carbonate and cooled. An orange solid separates and is collected by filtration. The yield of product is 20 g. (40%) M.P. 175–180° C. This may be converted to its hydrochloride with dry HCl gas in a suitable solvent.

*Analysis.*—Calcd. for: $C_8H_{11}N_5O_5$: C, 37.35; H, 4.31; N, 27.23. Found: C, 37.32; H, 4.13; N, 26.98.

(B) Preparation of 1-(2 - hydroxyethyl)-5-oxo-3-(5-nitro-2-furyl)-$\Delta^2$-1,2,4-triazoline.—A mixture of N-[1-(2-hydroxyethyl)ureido] - 5 - nitro-2-furamidine hydrochloride and nitrobenzene (400 ml.) is heated at reflux for 15 minutes. The hot nitrobenzene solution is decanted from the dark solid which separates from solution. When the nitrobenzene solution is cooled and diluted with ether, the product separates as a brown solid. Washing of the solid with 50% acetic acid gives a greenish-yellow solid (45 g., 38%); M.P. 230–235° C. Recrystallization of the product from glacial acetic acid raises the melting point to 263–264° C.

*Analysis.*—Calcd. for $C_8H_8N_4O_5$: C, 40.00; H, 3.36; N, 23.33. Found: C, 40.01; H, 3.39; N, 23.54.

Example VII.—0.0-diethyl-1-[5-imino-3-(5-nitro-2-furyl)-$\Delta^2$-1,2,4-triazoline]thiophosphate A mixture of 5-imino-3-(5-nitro-2-furyl)-$\Delta^2$-1,2,4-triazoline (58.5 g.; 0.3 mole), 0,0-diethyl phosphorochloridothioate (56.7 g.; 0.3 mole), sodium methoxide (16.2 g.; 0.3 mole), and ethanol (1200 ml.) is refluxed for 30 minutes. The hot solution is filtered by suction to remove sodium chloride and any unreacted material. As the filtrate cools, the product separates rapidly as a tan solid. Water is added to the filtrate to complete crystallization. The yield of product is 40 g. (38%); M.P. 158° C. Recrystallization from methanol (30 ml./g.), gives 29 g. of pale yellow needles melting at 160–161° C.

*Analysis.*—Calcd. for $C_{10}H_{14}N_5O_5PS$: C, 34.58; H, 4.07; N, 20.17; S, 9.23. Found: C, 34.57; H, 3.97; N, 20.08; S, 9.35.

Example VIII.—1-methyl-5-imino-3-(5-nitro-2-furyl)-$\Delta^2$-1,2,4-triazoline

METHOD A (1) Preparation of N-(1-methylguanidino)-5-nitro-2-furamidine dihydrochloride.—A solution of 1-amino-1-methylguanidine hydrochloride (37.2 g.; 0.3 mole), ethyl 5-nitro-2-furimidate hydrochloride (66.3 g.; 0.3 mole), and dimethylformamide (300 ml.) is heated at 50–60° for 30 minutes. The solution is cooled and diluted with ether. A gum separates. The gum is washed with ether and is heated on the steam bath to remove traces of ether. This product is used in the next step without further purification.

(2) Preparation of 1 - methyl-5-imino-3-(5-nitro-2-furyl)-$\Delta^2$-1,2,4-triazoline.—The N-(1-methylguanidino) - 5-nitro-2-furamidine dihydrochloride is covered with nitrobenzene (200 ml.). The mixture is boiled for 10 minutes. The hot solution is decanted from the dark solid which separates. After cooling, the solution is diluted with ether. A solid separates. The solid is collected by filtration, washed with ether, and dried at 80° C. A yield of 6 g. (10%) of product melting at 270° C. is obtained. Recrystallization of the product from acetic acid (20 ml./g.) gives a melting point of 306–307° C.

*Analysis.*—Calcd. for $C_7H_7N_5O_3$: C, 40.19; H, 3.37; N, 33.48. Found: C, 40.39; H, 3.47; N, 33.37.

METHOD B

A mixture of 5-imino-3-(5-nitro-2-furyl)-Δ²-1,2,4-triazoline (58.5 g.; 0.3 mole), methyl iodide (42.3 g.; 0.3 mole), and methanol (700 ml.) is heated to reflux. A solution of sodium methoxide (16.2 g.; 0.3 mole) in methanol (200 ml.) is added dropwise to the stirred mixture. The mixture is refluxed for 1 hour after the addition is completed. The mixture is cooled and filtered. The product is obtained as a brownish-yellow solid (40 g., 63%) melting at 300° C. The product is recrystallized from glacial acetic acid (20 ml./g.) to give 30 g. melting at 302–303° C. Further recrystallization raises the melting point to 306–307° C.; identical with 1-methyl-5-imino-3-(5-nitro-2-furyl)-Δ²-1,2,4-triazoline, of Method A.

Example IX.—5-imino-1-(2-hydroxyethyl)-3-
(5-nitro-2-furyl)-Δ²-1,2,4-triazoline

A mixture of the compound of Example II (65 g., 0.33 mole), ethylene bromohydrin (42 g., 0.33 mole), and ethanol (400 ml.) is placed in a 1 l., three neck flask fitted with a stirrer, reflux condenser, and dropping funnel. The stirred, refluxing mixture is treated with a solution of sodium methylate (18 g., 0.33 mole) in ethanol (200 ml.). Reflux is continued for 1 hour after the addition is completed. The filtrate is evaporated almost to dryness at reduced pressure. Water (200 ml.) is added to the residue and the flask is cooled in an ice bath. The brown solid which separates is collected by filtration and dried at 100° to yield 17 g. of product (21.5%); M.P. ca. 200°. Recrystallization of the product from nitromethane (30 ml./g.) raises the melting point to 213–214°.

*Analysis.*—Calcd. for $C_8H_9N_5O_4$: C, 40.17; H, 3.79; N, 29.28. Found: C, 40.24; H, 3.69; N, 29.34.

What is claimed is:

1. A compound of the formula:

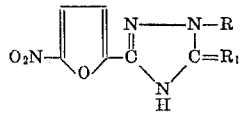

wherein R is a member of the group consisting of hydrogen, methyl, acetyl, hydroxyethyl and diethoxythiophosphoryl; and $R_1$ is a member of the group consisting of oxygen, imino and acetylimino.

2. 1 - methyl - 5-imino-3-(5-nitro-2-furyl)-Δ²-1,2,4-triazoline.

3. 1-(2-hydroxyethyl)-5-oxo-3-(5 - nitro-2-furyl)-Δ²-1,2,4-triazoline.

4. 5-imino-3-(5-nitro-2-furyl-Δ²-1,2,4-triazoline.

5. 1 - acetyl-5-imino-3-(5-nitro-2-furyl)-Δ²-1,2,4-triazoline.

6. 1 - methyl - 5-oxo-3-(5-nitro-2-furyl)-Δ²-1,2,4-triazoline.

7.

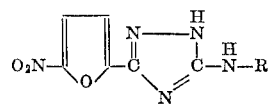

wherein R is selected from the group consisting of hydrogen and acetyl.

References Cited

UNITED STATES PATENTS

| | | | |
|---|---|---|---|
| 2,385,284 | 9/1945 | Knapp | 167—33 |
| 2,863,803 | 12/1958 | Benghiat et al. | 167—33 |
| 2,987,520 | 6/1961 | Sickman | 260—308 |
| 3,021,336 | 2/1962 | Morin et al. | 260—308 |

OTHER REFERENCES

Weidinger et al.: (German Auslegeschrift) 1,073,499, Jan. 21, 1960.

Mndhoyan et al.: Chem. Abstracts, vol. 52, pages 12851-2 (1958).

Howard et al.: J. Org. Chem., vol. 26, pages 1651-2 (1961).

ALTON D. ROLLINS, *Primary Examiner.*

N. S. RIZZO, *Examiner.*